Jan. 8, 1952          C. A. PAPENDICK          2,582,154
                        CUTTING MACHINE
                      Filed Oct. 2, 1947
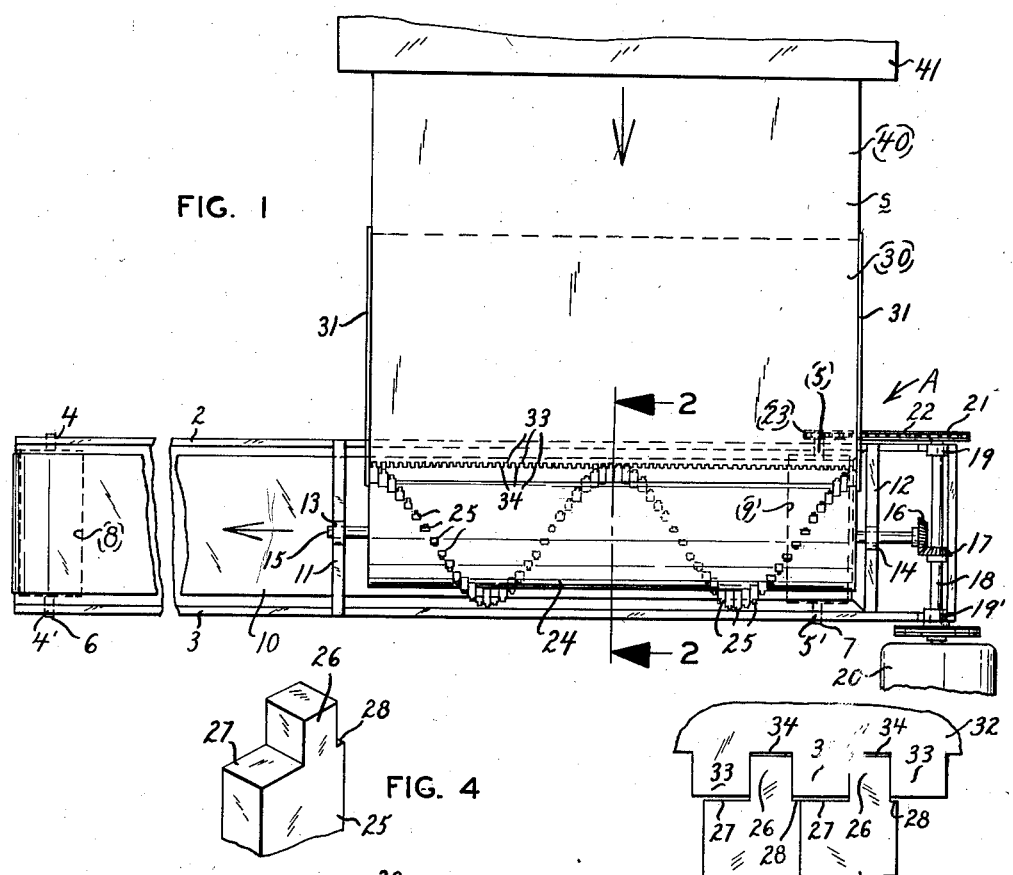
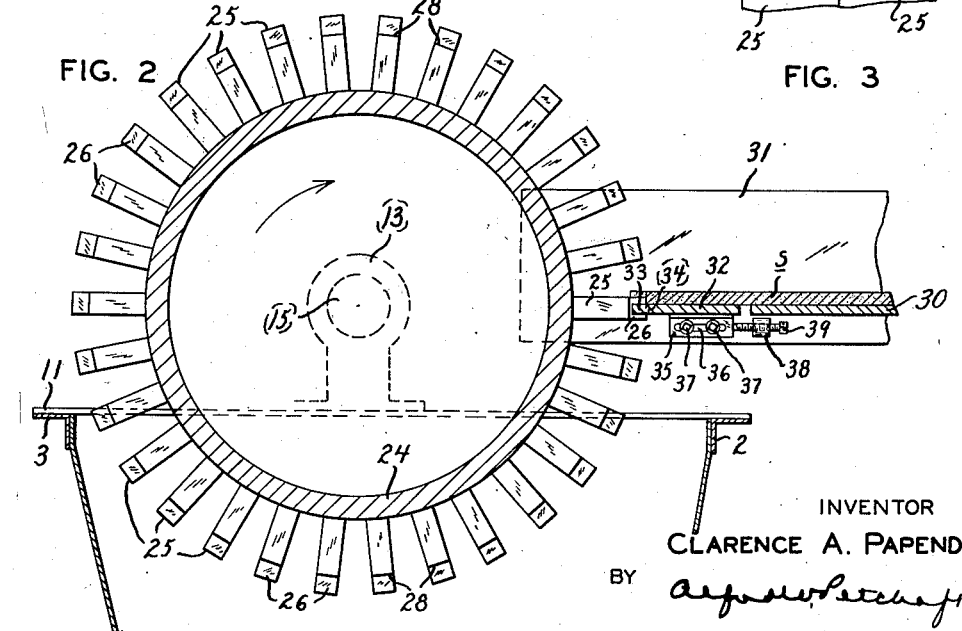
INVENTOR
CLARENCE A. PAPENDICK
BY
ATTORNEY Patented Jan. 8, 1952

2,582,154

UNITED STATES PATENT OFFICE 2,582,154

CUTTING MACHINE

Clarence A. Papendick, Normandy, Mo.

Application October 2, 1947, Serial No. 777,537

2 Claims. (Cl. 146—119)

This invention relates generally to cutting machines and, more particularly, to cutters designed to cut baked dough sheets into particles of uniform predetermined size and shape.

A number of commercial products are manufactured by baking a relatively large thin dough sheet and subsequently comminuting the baked dough sheet to produce particles of a fairly coarse size. For example, kibbled dog food is baked in large relatively thin flat sheets which are chopped, broken up, or otherwise macerated to form particles of a size approximating a ball of about ¾" diameter. One of the great difficulties encountered in this manufacturing process results from the obvious and natural tendency of baked dough sheets to shatter and form a relatively high percentage of small crumbs or so-called "fines," which must be screened out. The particles thus formed tend to crumble somewhat upon further handling, thereby increasing the quantity of fines and, finally, such particles will further crumble or shatter after being placed in containers for distribution to the purchasing public, with the result that even the most carefully screened kibbled dog food will contain a certain amount of fines in the consumer package. Another obvious disadvantage which is encountered as a result of existing conventional methods is that the product is not of uniform size and shape. It has been found that the most desirable type of product, if obtainable, should be of uniform size and shape and should contain practically no fines. It has also been found that the most desirable particle shape for products of this type is a shape closely approximating rectilinear proportions such as, for example, a cube, because particles of such shape are attractive in appearance and seem to have a lesser tendency to shatter or crumble during subsequent handling and after being packaged.

The primary object of the present invention, hence, is to provide a machine for cutting baked dough sheets which is simple and economical in construction and highly efficient in operation.

It is a further object of the present invention to provide a machine of the type described which cuts baked dough sheets into particles of predetermined size and shape with a minimum of waste.

It is an additional object of the present invention to provide a machine of the type stated which will cut baked dough sheets into particles of uniform size and shape at a substantially high rate of speed with a minimum production of crumbs or fines.

It is also an object of the present invention to provide a machine of the type stated which will continuously cut a baked dough sheet into cubical particles of substantially uniform size.

With the above and other objects in view, my invention resides in the novel features of form, construction, arrangement, and combination of parts presently described and pointed out in the claims.

In the accompanying drawing—

Figure 1 is a fragmentary top plan view of a cutting machine constructed in accordance with and embodying the present invention;

Figure 2 is a transverse sectional view taken along line 2—2 of Figure 1;

Figure 3 is a fragmentary plan view of the cutter elements showing the interengagement therebetween;

Figure 4 is a fragmentary perspective view of a cutting tooth.

Referring now in more detail and by reference characters to the drawings, A designates a cutting machine comprising spaced parallel frame members 2, 3, provided with aligned bearings 4, 4', and 5, 5', respectively. Journalled in said bearings 4, 4', and 5, 5', are shafts 6, 7, respectively. Suitably mounted for rotation on said shafts 6, 7, are drums 8, 9, respectively, providing moving means for a conveyor belt 10 stretched thereon. Provided on said frame members 2, 3, and transversely extending therebetween, are spaced aligned bars 11, 12, on which are supported aligned upstanding bearings 13, 14, for receiving a cutter shaft 15 which, in turn, projects through and beyond the bearing 14 and is provided on its end with a bevel gear 16. Said gear 16 meshingly co-operates with a bevel pinion 17 mounted on a drive shaft 18 journalled in bearings 19, 19', mounted on said frame members 2, 3, respectively. Said drive shaft 18 is connected at one end through a conventional variable speed drive 20 to a conventional electric motor (not shown), and the other end of said drive shaft 18 extends through the bearing 19' and supports a sprocket wheel 21. The teeth of said wheel 21 engage the links of a chain 22 which also engage the teeth of a relatively smaller sprocket wheel 23 mounted on the end of the shaft 7 which extends through the bearing 5'.

Pinned, keyed, or otherwise rigidly mounted upon the shaft 15 is a cutter cylinder 24 provided with a plurality of radially extending rectangular cutters 25 arranged in spiral formation around the outer peripheral surface of the cylinder 24. Each cutter 25 is provided upon its outer end with an outwardly projecting rectangular tooth 26 which in effect, divides the outer end of the cutter into a broad shoulder face 27 and a narrow shoulder face 28, as best seen in Figure 4.

Welded upon its under face, or otherwise rigidly secured to the top margin of the frame member 2 and extending horizontally outwardly therefrom in lateral alignment with the cutter cylinder is a feed plate 30 provided along its side margins with upstanding guide plates 31. Along its transverse inner margin, adjacent the cutter cylinders, the feed plate 30 is provided with a horizontally adjustable stationary cutter bar 32 having a uniformly spaced series of rectangular teeth 33 and so-called gullets or inter-tooth spaces 34 for complementary engagement with the teeth 26 of the cutter cylinder 24, as best seen in Figure 3. At its lateral ends, the cutter bar 32 is integrally provided with depending ears 35 having elongated slots 36 for slidably engaging locking bolts 37 mounted in the guide plates 31. Also mounted upon the guide plates 31 just rearwardly of the cutter bar 32 are inwardly projecting bosses 38 threadedly provided with cutter-bar adjustment screws 39 which abut at their forward ends against the rear edge of the cutter bar 32. At its rearward transverse margin, the feed plate 30 terminates adjacent the end of a conventional traveling belt conveyor 40 forming a component part of a tunnel-type oven 41.

In operation, a dough sheet s which has been thoroughly baked by passage through the oven 41 at a steady speed upon the belt 40, moves out onto and across the feed plate 30 toward the cylinder 24, which is rotating in the direction shown by the arrow in Figure 2, and at a rate of speed in relation to the speed of movement of the baked dough sheet s such that each tooth 26 will make one revolution while the baked dough sheet s moves forward a lineal distance equal to the depth of the gullets 34. As the forward edge of the baked dough sheet s first crosses the cutter bar 32, the teeth 26 will bite irregular pieces out of the uneven forward margin of the dough sheet s. However, as soon as the initial portion has been cut away and the baked dough sheet s is "squared off," so to speak, the teeth 26 will continue thereafter to punch out cleanly cubed pieces of baked dough.

It should be noted that, due to the spiral arrangement of the teeth 26 around the cutter cylinder 24, only two symmetrically placed teeth 26 will be in cutting engagement with the baked dough sheet s at a time. Furthermore, the progression of tooth engagement is outwardly in both directions from the center so that the tendency for transverse buckling in the baked dough sheet s is overcome. It will be apparent that the spaces between the teeth 26 will act as gullets for the teeth 33 on the cutter bar 34 so that the teeth 33 will cut off the intermediate portions of baked dough left uncut by the teeth 26 and thus an entire section across the whole width of the dough sheet s will be cut into uniform cubes upon a single revolution of the cylinder 24. The cubes of baked dough thus formed will drop onto the conveyor belt 10 for transportation to subsequent handling apparatus (not shown).

If desired, the cutter bar 32 may be adjusted rearwardly away from the cylinder 24 within limits of movement not exceeding the depth of the gullets 34 to produce particles of rectilinear rather than cubical shape. It will, of course, be understood that for practical purposes this adjustment cannot be carried to the extreme full depth of the gullets 32 because in such case no effective cutting could be accomplished but actually an adjustment can be made which will result in half-size or one-third size particles, for example.

It should be understood that changes and modifications in the form, construction, arrangement, and combination of the several parts of the cutting machine may be made and substituted for those herein shown and described without departing from the nature and principle of my invention.

Having thus described my invention, what I claim and desire to secure by Letters Patent is:

1. A cube cutting machine comprising in combination, a smooth rotatable cylinder and elongated cutting teeth individually projecting radially from the cylinder in a spiral series extending as a discontinuous rib completely around the cylinder and said teeth being spaced circumferentially from each other so that only one tooth in said series is cutting at one time, each of said teeth having a stepped outer surface with a broad shoulder on one side of the tooth and a narrow shoulder on the opposite side of the tooth lengthwise of the cylinder whereby the broad shoulder of one tooth follows a path adjacent the path of the narrow shoulder of the next tooth in said series.

2. A machine for cutting a continuously traveling baked dough sheet comprising, in combination, a smooth-surfaced rotatable cylinder, cutting teeth projecting radially from the periphery of said cylinder and being arranged in a spiral series extending completely around the cylinder and being spaced circumferentially from each other so that only one tooth in said series is cutting at one time, a stationary cutter bar mounted in lateral alignment with said cylinder for co-operation with said teeth, and means for moving the dough sheet over the cutter bar and into the path of said cutting teeth.

CLARENCE A. PAPENDICK.

REFERENCES CITED

The following references are of record in the file of this patent:

UNITED STATES PATENTS

| Number | Name | Date |
|---|---|---|
| 851,321 | Sheward | Apr. 23, 1907 |
| 864,552 | Perkins | Aug. 27, 1907 |
| 1,131,229 | Giddings | Mar. 9, 1915 |
| 2,335,515 | Jehle | Nov. 30, 1943 |

FOREIGN PATENTS

| Number | Country | Date |
|---|---|---|
| 65,569 | Norway | Nov. 30, 1942 |